F. JONES, C. M. BROWN, J. S. FLEMING & W. L. McDONALD.
SHEAVE.
APPLICATION FILED SEPT. 18, 1907.

917,450.

Patented Apr. 6, 1909.

INVENTORS
Frank Jones
Charles M. Brown
John S. Fleming
William L. McDonald

BY

ATTORNEYS

WITNESSES

UNITED STATES PATENT OFFICE.

FRANK JONES, CHARLES M. BROWN, JOHN S. FLEMING, AND WILLIAM L. McDONALD, OF PLYMOUTH, OHIO.

SHEAVE.

No. 917,450.  Specification of Letters Patent.  Patented April 6, 1909.

Application filed September 18, 1907. Serial No. 393,460.

*To all whom it may concern:*

Be it known that we, FRANK JONES, CHARLES M. BROWN, JOHN S. FLEMING, and WILLIAM L. McDONALD, citizens of the United States, and residents of Plymouth, in the county of Richland and State of Ohio, have invented new and useful Improvements in Sheaves, of which the following is a full, clear, and exact description.

This invention has in view a trolley wheel or sheave provided with a grooved rim substantially centrally divided on a plane at right-angles to its axis, forming the entire rim into two separable half sections, each rim section having an internally-projecting flange, a hub portion, and means carried by the hub portion, separable therefrom and from the rim, and having marginal openings engaging flat against the outer face of the flange of each rim section, forcing the inner faces of these flanges together.

Reference is to be had to the accompanying drawings forming a part of this specification, in which similar characters of reference indicate corresponding parts in all the views.

Figure 1:
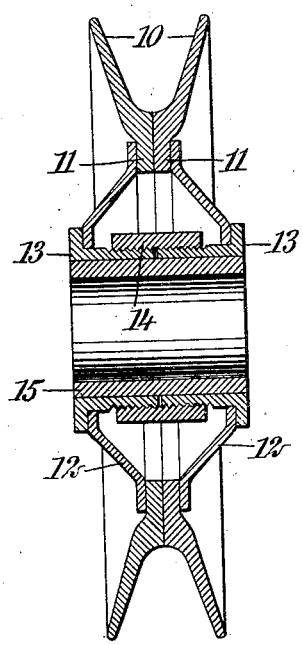
Figure 2:
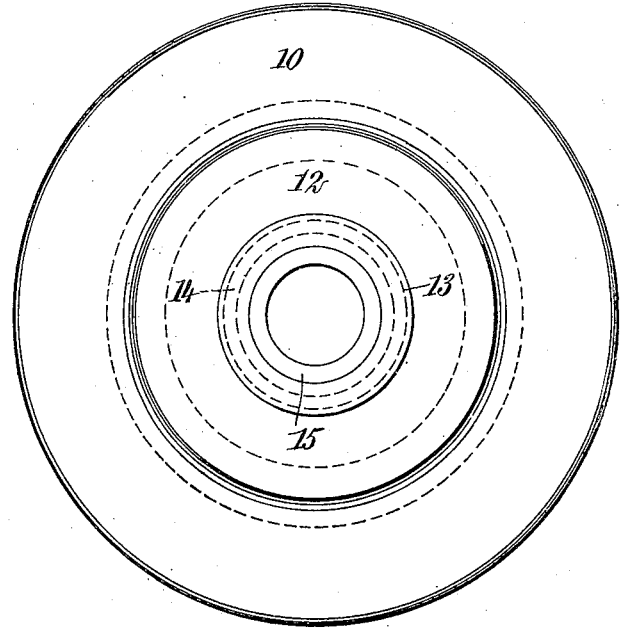

Figure 1 is a central vertical section through one form of our invention; Fig. 2 is a side view of the same; and Figs. 3 and 4 are central sectional views of modifications of the invention.

Referring to Figs. 1 and 2, we have therein illustrated a trolley wheel or sheave embodying our invention and which presents substantially the same form of rim found in an ordinary device of this character, the said rim, however, differing from the rim of the usual sheave in that it is made separate from the body of the wheel and is substantially centrally divided on a plane at right angles to its axis, forming the rim in two halves 10, 10.

Inwardly from the grooved portion of the rim, each half thereof is extended in the form of an internal annular flange 11, the faces of said flanges being tightly clamped together between dished or cone-shaped heads 12, which form the body of the wheel, the said heads having central openings for receiving the hub of the sheave or wheel by which they are forced together. This hub as shown in Figs. 1 and 2 is composed of externally flanged thimbles or collars 13, which engage the heads and are provided with threads which screw into a union 14, the tightening of which operates to clamp the two halves of the rim between the heads with any desired degree of firmness. Within the thimbles 13 we preferably insert a box or bushing 15 for receiving the axis of the sheave or wheel. By this construction it is apparent that should either half of the rim be broken or worn, the same may be renewed without the necessity of replacing the entire wheel as is the usual practice; also, the rim of the wheel may be manufactured at much less cost than is incident to the casting of the solid wheel.

Figure 3:
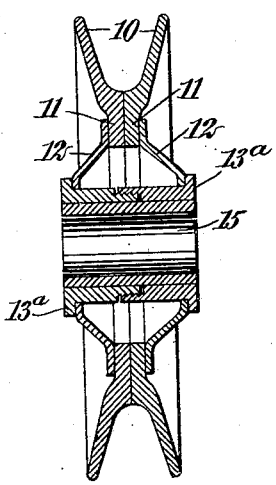
Figure 4:
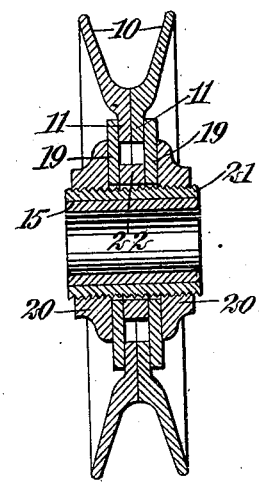

The form of our invention shown in Fig. 3 is in all respects like that shown in Fig. 1, except in the matter of the thimbles 13$^a$, corresponding to the thimbles 13, which, as shown, instead of being oppositely externally threaded and connected with the union, are respectively externally and internally threaded and directly engage with each other.

In Fig. 4 the annular flanges 11 of the rim are clamped between plates 19, the said plates being forced together by collars 20 threaded on the opposite ends of the thimble 21. Between the collars 20 is placed a spacing ring 22 of substantially the same thickness as the thickness of the annular flanges 11, whereby the plates 19, when the collars are tightly screwed up, will not collapse at their inner portions. The thimble 21 is provided with a snugly fitting bushing or box 15 as in the constructions illustrated in Figs. 1 and 3.

Having thus described our invention, we claim as new and desire to secure by Letters Patent:

A wheel having a grooved rim substantially centrally divided on a plane at right-angles to its axis, forming the entire rim into two separable half sections, each rim section having an internally projecting flange, a hub portion, and means carried by the hub portion, separable therefrom and from the rim, and having marginal portions engaging flat against the outer face of the flange of each rim section, forcing the inner faces of these flanges together.

In testimony whereof we have signed our names to this specification in the presence of two subscribing witnesses.

FRANK JONES.
CHARLES M. BROWN.
JOHN S. FLEMING.
WILLIAM L. McDONALD.

Witnesses:
HENRY DICK,
KARL F. WEBBER.